United States Patent [19]
Kato et al.

[11] Patent Number: 5,512,928
[45] Date of Patent: Apr. 30, 1996

[54] INFORMATION PRINTING SYSTEM HAVING INFORMATION PROCESSING APPARATUSES AND PRINTER INCLUDING PRINTING MEDIUM CASSETTES

[75] Inventors: Takeshi Kato, Hitachi; Shouji Saitoh, Takahagi, both of Japan

[73] Assignee: Hitachi, Ltd., Tokyo, Japan

[21] Appl. No.: 953,963

[22] Filed: Sep. 30, 1992

[30] Foreign Application Priority Data

Sep. 30, 1991 [JP] Japan ................... 3-276312

[51] Int. Cl.⁶ .................. G01D 15/14; G03G 21/00; B65H 1/26
[52] U.S. Cl. .................. 347/138; 347/139; 271/9.01; 355/311; 355/206; 355/308
[58] Field of Search ............... 271/9, 145, 162, 271/164, 9.01; 355/311, 308, 206; 346/108, 160; 358/302; 347/129, 138, 139, 245, 262, 263, 264

[56] References Cited

U.S. PATENT DOCUMENTS

| | | | |
|---|---|---|---|
| 3,597,071 | 7/1971 | Jones | 346/108 |
| 4,422,631 | 12/1983 | Sugizaki | 271/9 |
| 4,484,734 | 11/1984 | Tsudaka et al. | 271/9 |
| 4,610,445 | 9/1986 | Schneider et al. | 271/164 X |
| 4,728,094 | 3/1988 | Yoshida | 271/164 X |
| 4,748,479 | 5/1988 | Ohira et al. | 355/206 X |
| 4,922,295 | 5/1990 | Takano et al. | 355/206 X |
| 4,967,240 | 10/1990 | Kitano et al. | 355/308 X |
| 5,005,818 | 4/1991 | Hayashi et al. | 271/162 X |
| 5,012,280 | 4/1991 | Tsutsumi et al. | 355/206 |
| 5,157,448 | 10/1992 | Lang | 271/162 X |

FOREIGN PATENT DOCUMENTS

| | | | |
|---|---|---|---|
| 4003742 | 6/1992 | Japan | 271/9 |
| 4217521 | 8/1992 | Japan | 271/9 |

Primary Examiner—Peter S. Wong
Assistant Examiner—Randy W. Gibson
Attorney, Agent, or Firm—Antonelli, Terry, Stout & Kraus

[57] ABSTRACT

In a laser beam printer, printing information is sent from plural hosts and printing is carried out according to the printing information. A printing paper cassette detachment inhibition mechanism unit is provided on a printing paper cassette. The paper cassette detachment inhibition mechanism unit includes fixture grooves provided on the printing paper cassette and stop levers provided on a printing paper cassette mounting port. The printing paper cassette detachment inhibition mechanism unit inhibits the detachment of the printing paper cassette when the printing paper in the printing paper cassette has been selected for use by one of the hosts. A selected printing paper cassette display unit is provided on the laser beam printer and displays the selected printing paper cassette.

10 Claims, 8 Drawing Sheets

INFORMATION PRINTING SYSTEM HAVING INFORMATION PROCESSING APPARATUSES AND PRINTER INCLUDING PRINTING MEDIUM CASSETTES

BACKGROUND OF THE INVENTION

The present invention relates to an information printing system having information processing apparatuses and a printer including printing medium cassettes, and more particularly to an information printing system having information processing apparatuses and a laser beam printer including plural printing paper cassettes in which the information processing apparatuses share the laser beam printer having the plural printing paper cassettes.

In particular, the present invention relates to the laser beam printer in the information printing system in which a mount/detachment mechanism for the printing papers constituting a printing medium in the laser beam printer can be improved and control of the mount/detachment mechanism for the printing papers can be improved. The printing papers are accommodated in plural printing paper cassettes of a laser beam printer engine of the laser beam printer.

In a conventional information printing system, image data is edited by a personal computer and a word laser beam printer. Usually, the conventional information printing system is constituted such that plural information processing apparatuses share one laser beam printer, as disclosed in, for example Japanese patent laid-open No. 63-277135.

The above laser beam printer is constituted to print by using plural kinds of printing papers. However, the laser beam printer is not large enough to enable mounting of printing paper cassettes for accommodating all kinds (all sizes) of printing papers, and it is not economical to mount the printing paper cassettes for accommodating all kinds (all sizes) of printing papers, because it requires a large size laser beam printer.

Accordingly, in the conventional laser beam printer, since generally the number of printing paper cassette mounting ports is smaller than the number of kinds (sizes) of printing papers to be used, the laser beam printer is constituted to mount or detach selectively printing paper cassettes accommodating the printing papers to be selected or used.

In the above stated conventional laser beam printer, the printing paper cassette accommodates the printing papers corresponding to the printing paper size designation information, such a printing paper size designation information is included in the printing information.

When the printing information is input to the laser beam printer from the information processing apparatuses, it may occur that the printing paper cassette accommodating the designated printing paper according to the printing paper size designation information is not mounted on the laser beam printer.

Such an above fact for informing the non-mounting condition of the corresponding printing paper cassette is displayed on the information processing apparatus and then an operator is required to mount the corresponding printing paper cassette accommodating the designated printing papers to the laser beam printer.

In this time, when the printing paper cassette mounting port of the laser beam printer is a vacant port and is not in use, it is possible to mount the necessary printing paper cassette to the printing paper cassette mounting port. However, when the printing paper cassettes have been mounted on all of the printing paper cassettes mounting ports, it is necessary to detach one of them and it is necessary to mount the corresponding printing paper cassette on the laser beam printer.

In the above case, there is a case that the detached printing paper cassette has accommodated the printing papers so as to use or select to print another printing information, such another printing information is the printing waiting condition given by in accordance with the printing information in the former time or before the printing paper cassette has been detached.

In such above case, the laser beam printer can not to supply the designated printing papers at the printing time according to the another printing information, accordingly this causes an inconvenience the laser beam printer can not supply the designated printing papers which are accommodated in the printing paper cassette.

In the conventional information printing system in which plural information processing apparatuses share with one laser beam printer, since the printing paper cassette for accommodating the printing information at the printing waiting condition has been detached, there is a problem that the laser beam printer can not print to the printing papers in accordance with the above stated printing information.

SUMMARY OF THE INVENTION

An object of the present invention is to provide an information printing system having information processing apparatuses and a printer including printing medium cassettes wherein the printer can print surely according to the printing information.

Another object of the present invention is to provide an information printing system having information processing apparatuses and a printer including printing medium cassettes wherein the printing papers for use the printing information at the printing waiting condition can be ensured.

In accordance with the present invention, an information printing system having information processing apparatuses and a printer including printing medium cassettes includes plural information processing apparatuses for generating the printing information, the printing information includes the printing image data and the printing paper designation information; and a printer including printing medium cassettes accommodating the printing medium and an electrophotography process means, each of the printing medium cassette is mounted detachably on the printer, the printer prints the printing image data to the designated printing medium in accordance with the printing information given by the information processing apparatus.

In accordance with the present invention, in the information printing system having information processing apparatuses and a printer including printing medium cassettes, a printing medium cassette detachment inhibition means is provided on the printer, the printing medium cassette detachment means inhibits the detachment of the printing medium cassette accommodating the designated printing medium given by the information processing apparatus.

In accordance with the present invention, in the information printing system having information processing apparatuses and a printer having printing medium cassettes, a selected printing medium cassette display means is provided on the printer, the selected printing medium cassette display means displays the selection or use condition of the printing medium cassette accommodating the designated printing medium given by the information processing apparatus.

The printing paper cassette detachment inhibition means includes at least one fixture groove for engaging the printing paper cassette and at least one stop lever provided rotatively on the printing paper cassette, the fixture groove is provided on the printing paper cassette, and the stop lever engages with the fixture groove and inhibits the detachment of the printing paper cassette.

The selected printing paper cassette display means is provided on a laser beam printer engine and a multi-stage printing paper feeding apparatus.

Since the selected printing medium cassette display means displays the printing medium cassette designated by the printing medium designation information which is included in the printing information given by the information processing apparatus, the printing medium selected by the printing information at the printing waiting condition can be ensured.

As stated above, in accordance with the present invention, by the provisions of the selected printing medium cassette display means and the printing medium cassette detachment inhibition means, it is possible to display or inhibit the detachment of the printing medium cassette which is designated by the printing medium designation information, the printing medium designation information is included in the printing information given from the information processing apparatus.

Accordingly, it is possible to ensure that the printing medium selected by the printing information under the waiting condition will be available so that the printer can print certainly the printing information.

Since the printing medium cassette detachment inhibition means inhibits the detachment of the printing medium cassette designated by the printing medium designation information which is included in the printing information given by the information processing apparatus, the availability of the printing medium selected by the printing information at the printing waiting condition can be ensured.

DESCRIPTION OF THE INVENTION

One embodiment of an information printing system having plural information apparatuses and a laser beam printer including plural printing paper cassettes according to the present invention will be explained referring to drawings.

Figure 1:
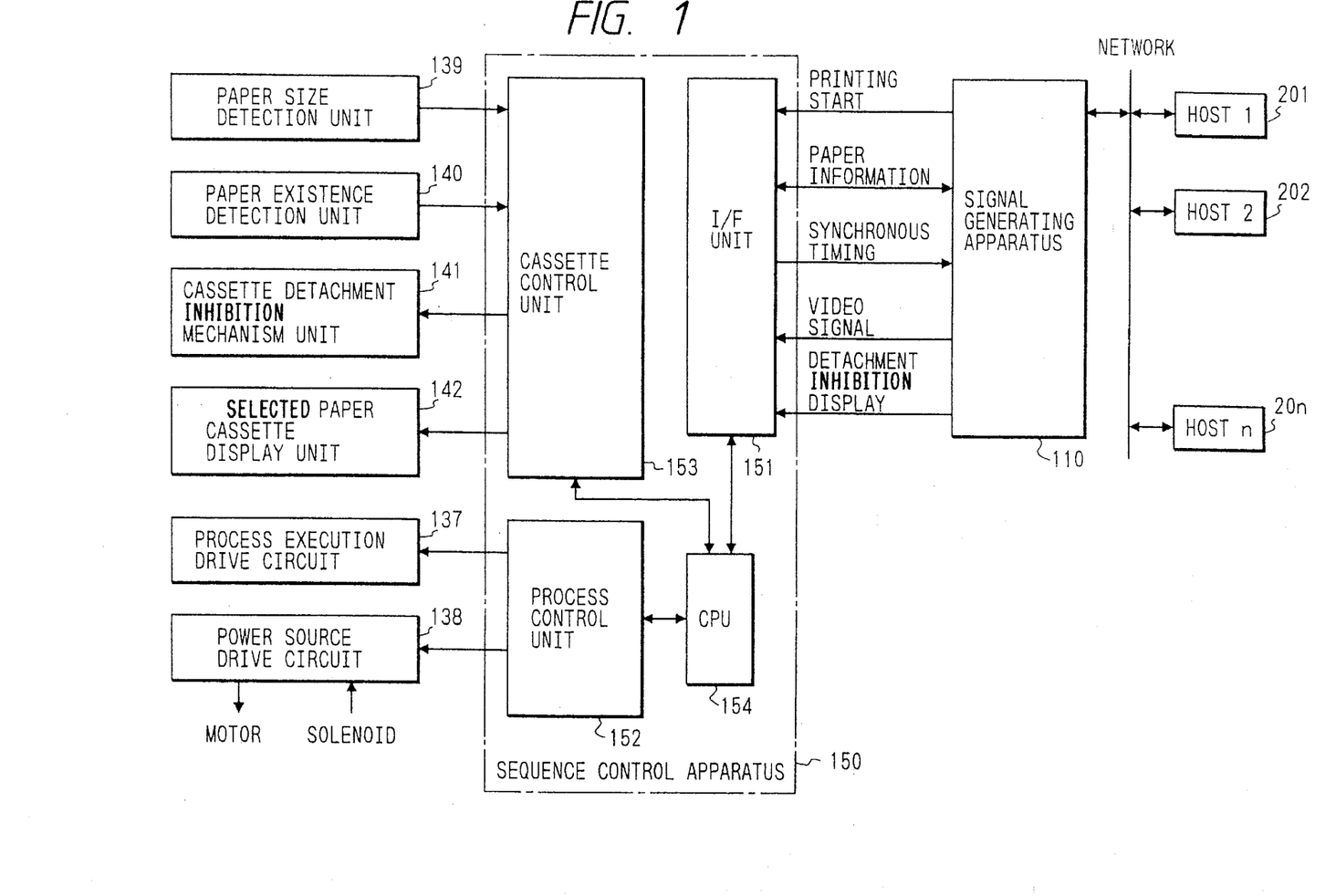
FIG. 1 is a block diagram showing one embodiment of an information printing system having plural information apparatuses and a laser beam printer including plural printing paper cassettes according to the present invention.
Figure 2:
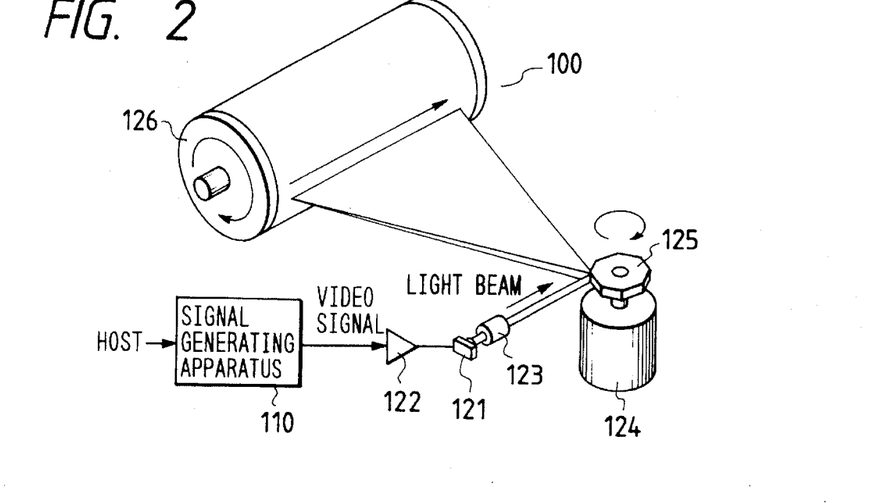
FIG. 2 is an operational principle of a laser beam printer which constitutes the information printing system having plural information apparatuses and a laser beam printer including plural printing paper cassettes according to the present invention.

As shown in FIG. 2, a laser beam printer 100 comprises a signal generating apparatus 110 for generating a printing dot signal (video signal) to be printed according to printing image data in response to the video signal etc. of the signal generating apparatus 110, a laser diode 121 for generating the laser beam, and a laser drive circuit 122 for driving the laser diode 121 according to the video signal from the signal generating apparatus unit 110.

The laser beam printer 100 comprises further a combination lens 123 for shaping the laser beam generated from the laser diode 121 and for producing light beam, a scanner motor 124 for rotating a polygon mirror 125, the polygon mirror 125 is rotated by the scanner motor 124 and is deflected repeatedly the light beam, and a photosensitive drum 126.

A toner image formation is formed by the laser beam printer 100 as follows. The laser beam printer 100 receives printing information from an information processing apparatus (hereinafter called a host).

According to the printing image data in response to the video signal from the signal generating apparatus unit 110, etc., the laser diode 121, the laser drive circuit 122, the combination lens 123, the scanner motor 124 and the polygon mirror 125, a two-dimensional electrostatic latent image is formed on outer peripheral surface of the photosensitive drum 126 by scanning and exposing toward the axial direction of the photosensitive drum 126 and the latent image is developed by development means (not shown).

This obtained toner image is transferred to the printing paper which is sent from a printing paper cassette and after that it is fixed to the printing paper which is then discharged as printed matter.

Figure 3:
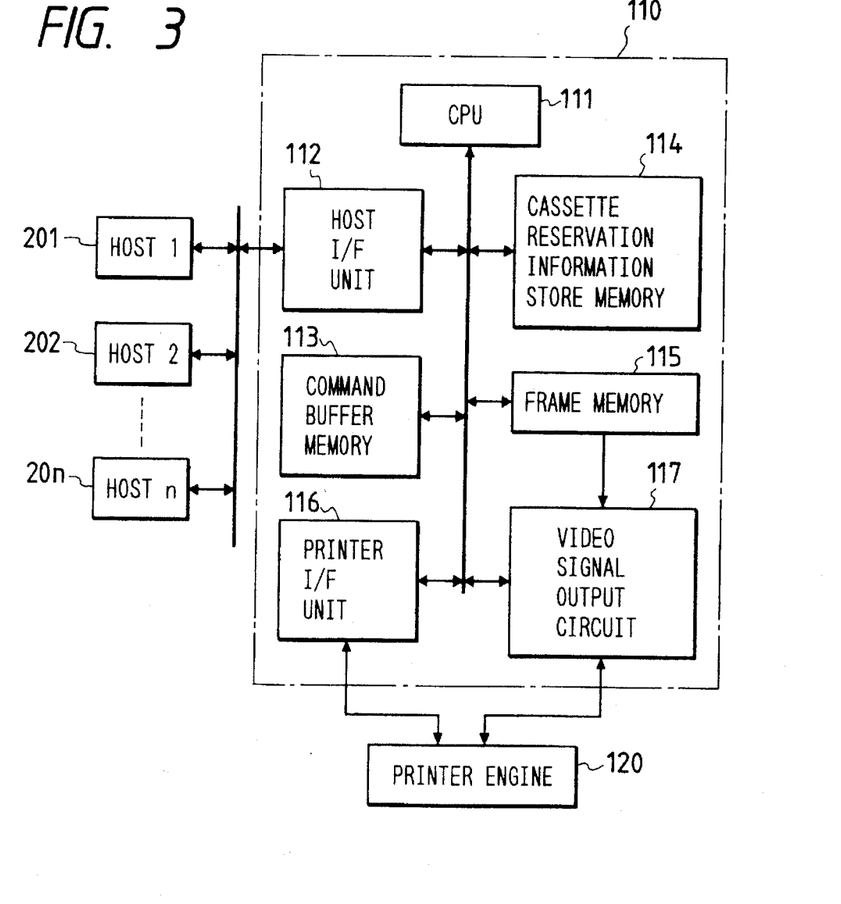
FIG. 3 is a block diagram showing one embodiment of a signal generating apparatus of an information printing system having plural information apparatuses and a laser beam printer including plural printing paper cassettes according to the present invention.

FIG. 3 is a block diagram showing a circuit construction of the signal generating apparatus 110 of the laser beam printer 100.

A CPU 111 receives the printing information through host interface (I/F) unit 112, such printing information including a printing request, printing paper size data, a printing command (printing image data), etc., which are sent from the hosts 201, 202, . . . , 20n. The received printing command is stored in a command buffer memory 113, until the printing of the printing information has finished the printing paper cassette information accommodating the printing papers corresponding to the printing paper size data is stored into a cassette reservation information store memory 114.

A signal for inhibiting and displaying the detachment of the printing paper cassette is sent to a laser beam printer engine 120. Further, CPU 111 describes the printing dot pattern in to a frame memory 115 in accordance with the printing command with respect to the characters and figures, etc., stored in the frame memory 115.

At the time when the description about the printing dot pattern of one page part has finished, through the laser beam printer interface (I/F) unit 116 by outputting the printing start signal into the laser printer engine 120 the electrophotography process of the laser beam printer 100 is initialized.

A video signal output circuit 117 outputs the printing dot pattern read out from the frame memory 115 as the video signal. This video signal synchronizes with the synchronization timing signal which is sent from the laser beam printer engine 120.

Herein, when the printing request is generated from the plural hosts 201, 202, . . . , 20n, so as to improve the through-put in the information printing system, CPU 111 receives the printing information sent from the hosts 201, 202, . . . , 20n and carries out in parallel the reception control processing for storing the printing information and the description control processing for the printing dot pattern into the frame memory 115.

Besides, when the printing paper cassette accommodating the printing paper designated in accordance with the received printing information is not mounted, such a condition is informed to the information processing apparatus and the information processing apparatus displays a message for requesting the mounting of such a specified and designated printing paper cassette.

Figure 4:
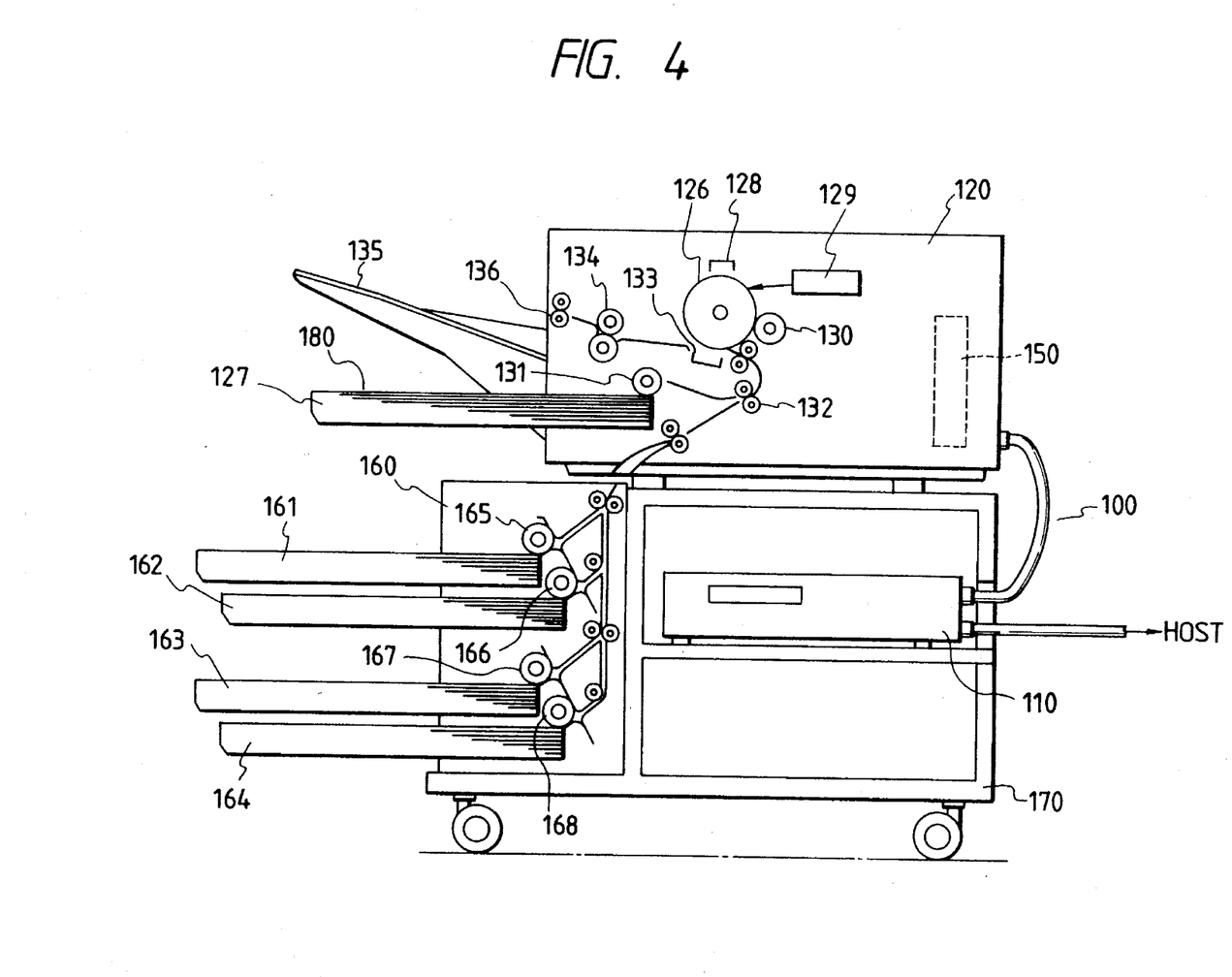
FIG. 4 is a longitudinal cross-sectional side view showing the laser beam printer.

FIG. 4 is a cross-sectional view showing the laser beam printer 100. In the laser beam printer 100 structure, the signal generating apparatus 110 and a multi-stage cassette printing paper feeding apparatus 160 for mounting the laser printer engine 120 and plural printing paper cassettes are combined on an installation stand 170, respectively.

The laser beam printer engine 120 installed on the installation stand 170 mounts detachably one printing paper cassette 127, and the multi-stage cassette printing paper feeding apparatus 160 provides four printing paper cassette mounting ports for mounting four printing paper cassettes 161, 162, 163, and 164.

Each of the four printing paper cassettes 161, 162, 163, 164 has the same outer shape that of the one printing paper cassette 127. In this information printing a total of five kinds of printing paper cassettes 127, 161, 162, 163, 164 are provided on the laser beam printer engine 120 and the multi-stage cassette printing paper feeding apparatus 160 and it can feed selectively the printing paper from the printing paper cassettes 127, 161, 162, 163, 164.

The laser beam printer engine 120 comprises the photosensitive drum 126 for carrying out the electrophotography process, a charger 128 for charging uniformly the outer surface of the photosensitive drum 126, a laser beam exposure apparatus 129 for exposing the uniformly charged photosensitive drum 126 and for forming the electrostatic latent image, and a developer 130 for forming the toner image on the outer surface of the photosensitive drum 126 by developing the electrostatic latent image.

The laser beam printer engine 120 comprises further a printing paper feeding roller 131 for discharging printing paper 180 from the printing paper cassette 127 and for feeding the extracted printing paper, resist rollers 132 for shaping the fed printing paper 180 and for adjusting the transportation timing of the printing paper 180, a transfer unit 133 and for transferring the printing paper 180 by contacting the printing paper 180 to the photosensitive drum 126 and giving the charge for transfer at a back surface of the photosensitive drum 126.

The laser beam printer engine 120 comprises further a fixing unit 134 for fixing the toner image to the printing paper 180 by pressuring and heating the printing paper 180 being transferred the toner images, and a printing paper discharge roller 136 for discharging toward a printing paper discharge tray 135 the printing paper 180 on which the toner images are fixed the toner images.

Further, the multi-stage cassette printing paper feeding apparatus 160 provides printing paper feeding rollers 165, 166, 167, 168 for feeding printing paper 180 by extracting the printing paper 180 from each of the printing paper cassettes 161, 162, 163, 164 and for feeding the printing paper 180 to the laser beam printer engine 120.

Each of the controls for each of means in the laser beam printer engine 120 and the multi-stage cassette printing paper feeding apparatus 160 is carried out by a sequence control apparatus 150 which is installed in the laser beam printer engine 120.

The sequence control apparatus 150 provides an interface (I/F) unit 151 to the signal generating apparatus 110, a process control unit 152 for controlling the electrophotography process, and CPU 154 for controlling these means, respectively.

The process control unit 152 controls the charger 128 for charging uniformly the outer surface of the photosensitive drum 126, the laser beam exposure apparatus 129 for exposing the uniformed charging photosensitive drum 126 and for forming the electrostatic latent image, the developer 130 for forming the toner image on the outer surface of the photosensitive drum 126 by developing the electrostatic latent image, and the transfer unit 133 for transferring the printing paper 180 which is sent from the resist roller 132, the fixing unit 134 for fixing the toner image to the printing paper 180.

The process control unit 152 controls a process execution drive circuit 137 for controlling the discharge roller 136 which discharges the printing paper 180 on which the toner images are fixed. The process control unit 152 controls further a power source drive circuit 138 for driving a drive motor and a printing paper feeding control solenoid and so on.

In accordance with an input information from the laser beam printer engine 120 and a printing paper size detection unit 139 with respect to the printing paper cassettes 161, 162, 163, 164 mounted on the multi-stage cassette printing paper feeding apparatus 160, a printing paper cassette control unit 153 recognizes the size of the printing papers which are accommodated in the above printing paper cassettes.

In accordance with an input information from a printing paper existence detection unit 140, the printing paper cassette control unit 153 recognizes the existence of the printing papers which are accommodated in the printing paper cassettes 127, 161, 162, 163, 164.

In accordance with the control signal from the signal generating apparatus 110, by controlling a printing paper cassette detachment inhibition mechanism unit 141 the printing paper cassette control unit 153 inhibits the detachment of the printing paper cassette accommodating the printing papers, this printing paper cassette is used or selected for the printing of the printing information at the printing waiting condition.

And the printing paper cassette control unit 153 indicates which of printing paper cassettes 127, 161, 162, 163, 164 have been selected with a selected printing paper cassette display unit 142.

When CPU 154 receives the printing paper size information conformation signal from the signal generating apparatus 110 through the interface (I/F) unit 151, CPU 154 sends the printing paper information about the size of the printing papers which are accommodated in each of the printing paper cassettes 127, 161, 162, 163, 164 mounted on the laser beam printer engine 120 and the multi-stage cassette printing paper feeding apparatus 160 and the existence of the printing paper 180 is obtained from the printing paper cassette control unit 153.

The obtained printing paper information is sent to the signal generating apparatus 110 and it inhibits the detachment of the printing paper cassette which accommodates the printing paper for selecting the printing for the printing information at the printing waiting condition.

When CPU 154 receives the control signal for displaying the printing paper 180, such a control signal is given to the printing paper cassette control unit 153 and controls the printing paper cassette detachment inhibition mechanism unit 141 and the selected printing paper cassette display unit 142.

Further, when CPU 154 receives the printing start signal, CPU 154 indicates to initialize the electrophotography process to the process control unit 152 and further carries out to control the sending of the synchronous timing signal for generating the video signal to the signal generating unit 110.

Next, one example of the printing paper cassette detachment inhibition mechanism unit 141 and the printing paper cassette display unit 142 will be explained in detail referring to from FIG. 5 to FIG. 7.

Figure 5:
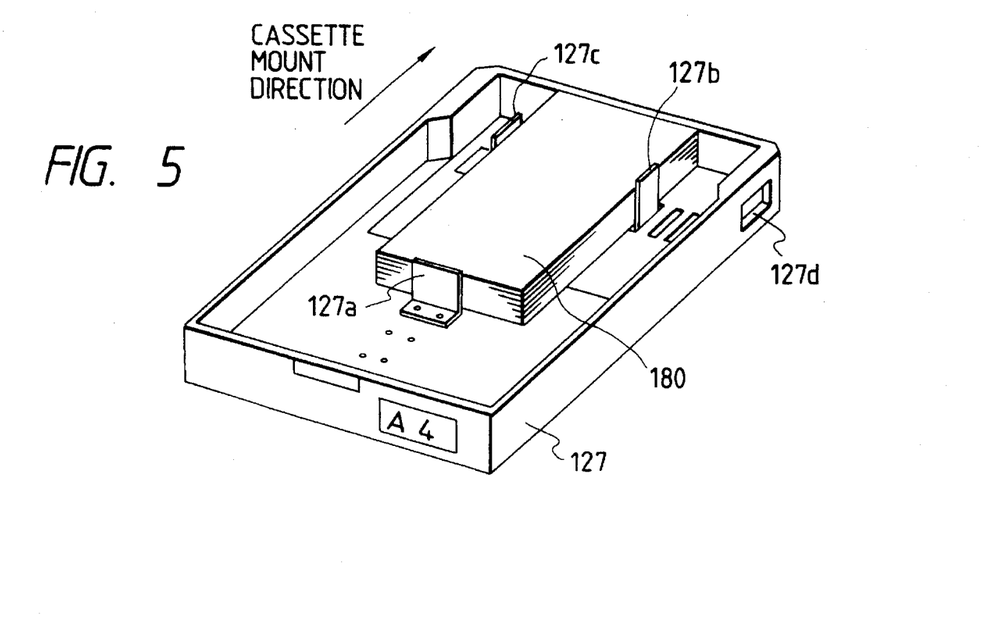
FIG. 5 is a perspective view showing one embodiment of a printing paper cassette which constitutes the information printing system having plural information apparatuses and a laser beam printer including plural printing paper cassettes according to the present invention.

FIG. 5 is a perspective view showing each kind of printing paper cassette mounted on the laser beam printer engine 120 and the multi-stage cassette printing paper feeding apparatus 160.

The printing paper cassette 127 is constituted to accommodate A4 size printing papers 180. The display and the alternation of the specification of the printing paper are carried out by changing the installation position of a printing paper end regulating blade 127a and printing paper end regulating blades 127b and 127c. Further the display and the alternation of the specification of the printing paper are carried out by changing a display plate (not shown) read on by the printing paper size detection unit 139.

At both end sides of the printing paper cassette 127, so as to engage the printing paper cassette 127 with the printing paper cassette detachment inhibition mechanism unit 141, two cassette fixture grooves 127d for inhibiting the detachment of the printing paper cassette 127 are provided respectively on the outer side portions of the printing paper cassette 127.

Figure 6:
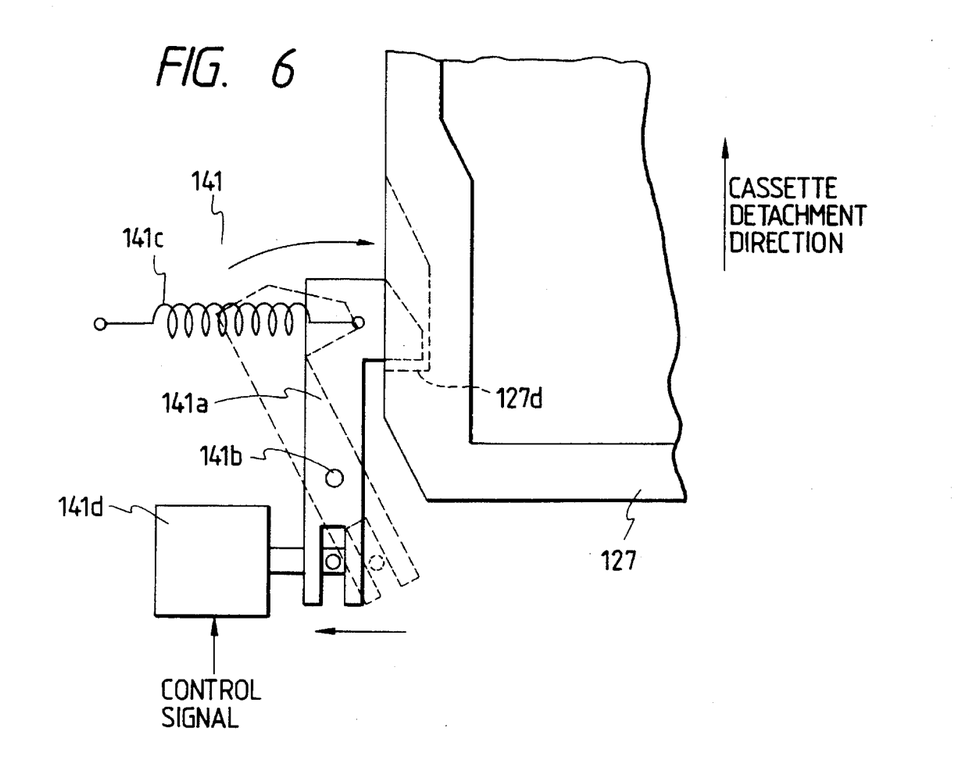
FIG. 6 is a plane view showing a printing paper cassette detachment inhibition mechanism unit which constitutes the information printing system having plural information apparatuses and a laser beam printer including plural printing paper cassettes according to the present invention.

FIG. 6 is an enlarged view showing the printing paper cassette detachment inhibition mechanism unit 141. A stop lever 141a for inhibiting the detachment of the printing paper cassette 127 is installed rotatively on the printing paper cassette detachment inhibition mechanism unit 141 around a fulcrum 141b.

By rotating the stop lever 141a in the counterclockwise direction, one end of the printing paper cassette detachment inhibition mechanism unit 141 can engage with the cassette fixture groove 127d which formed on the printing paper cassette 127 and mounted on the printing paper cassette mounting port.

And further the printing paper cassette detachment inhibition mechanism unit 141 can inhibit detachment of printing paper cassette 127, thereby the printing paper cassette 127 is inhibited from being detached from the laser beam printer engine 120.

The stop lever 141a of the printing paper cassette detachment inhibition mechanism unit 141 rotates in the counterclockwise direction by giving always the rotational force in the counterclockwise direction by a spring member 141c. A solenoid 141 connected to another end of the printing paper cassette detachment inhibition mechanism unit 141 is biased by the printing paper cassette control unit 153 and when a plunger is absorbed the stop lever 141a is rotated against the above stated rotational force.

When the solenoid 141d of the printing paper cassette detachment inhibition mechanism unit 141 is de-energized, the stop lever 141a is rotated in the counterclockwise direction by the force of the spring member 141c and thereby it is possible to detach the printing paper cassette 127 or it is possible to release the detachment inhibition of the printing paper cassette 127.

Figure 7:
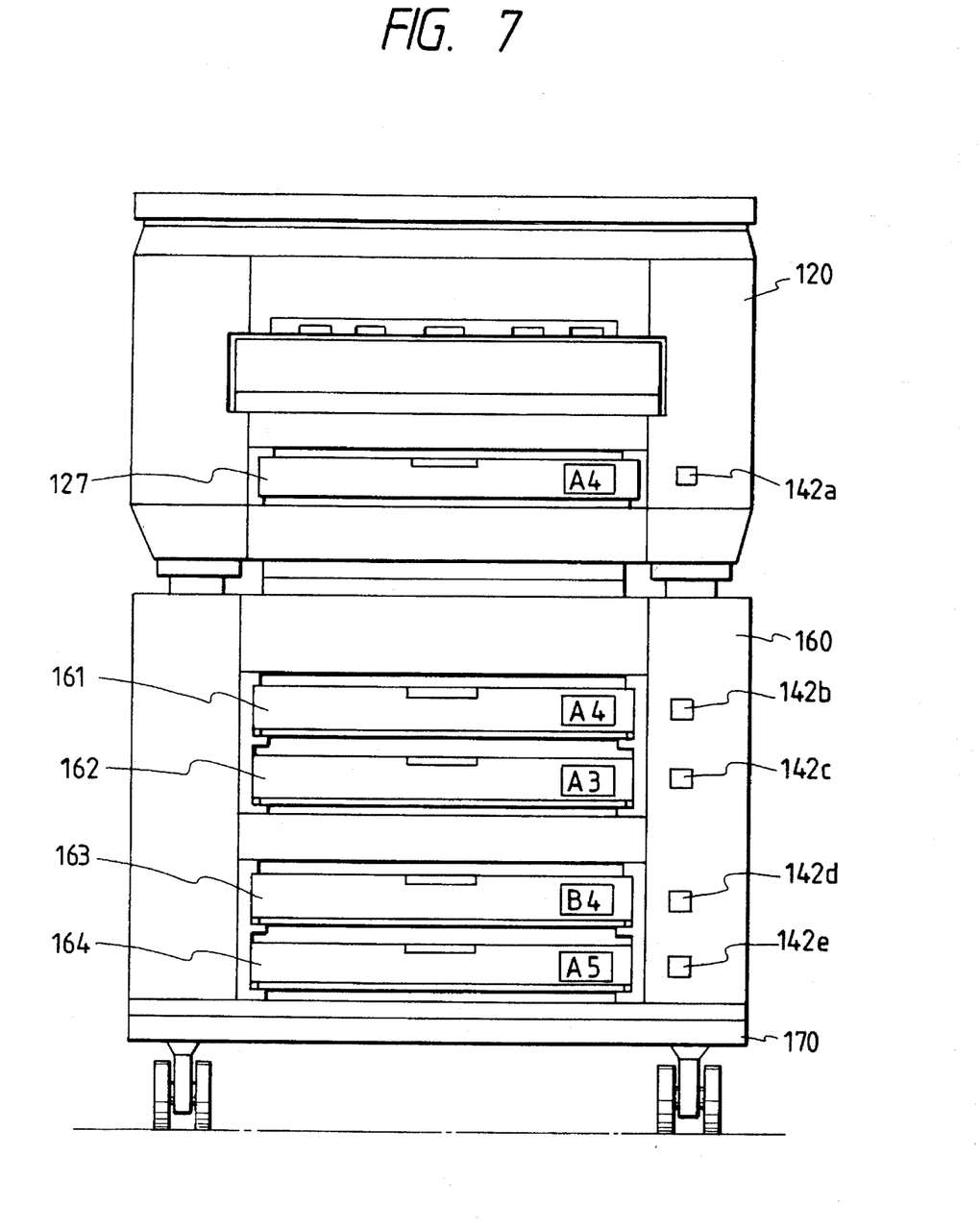
FIG. 7 is a side view showing one embodiment of a selection paper cassette which constitutes the information printing system having plural information apparatuses and a laser beam printer including plural printing paper cassettes according to the present invention.

FIG. 7 is a side view showing the laser beam printer engine 120 and the multi-stage cassette printing paper feeding apparatus 160 and further the printing paper cassette display unit 142 is shown.

At a right side of the printing paper cassettes 127, 161, 162, 163, 164 on the body of the laser printer engine 120, LED display means 142a, 142b, 142c, 142d, 142e for displaying a light in the selected condition (use waiting condition) of each of the printing paper cassettes 127, 161, 162, 163, 164 are provided respectively.

Each of LED display means 142a, 142b, 142c, 142d, 142e corresponds to the printing paper cassette 127, 161, 162, 163, 164 indicated by the above control signal. This control signal is output from the signal generating apparatus 110 according to the printing information at the waiting condition and the corresponding LED display means 142a, 142b, 142c, 142d, 142e is controlled to turn on by the printing paper cassette control unit 153.

Figure 8:
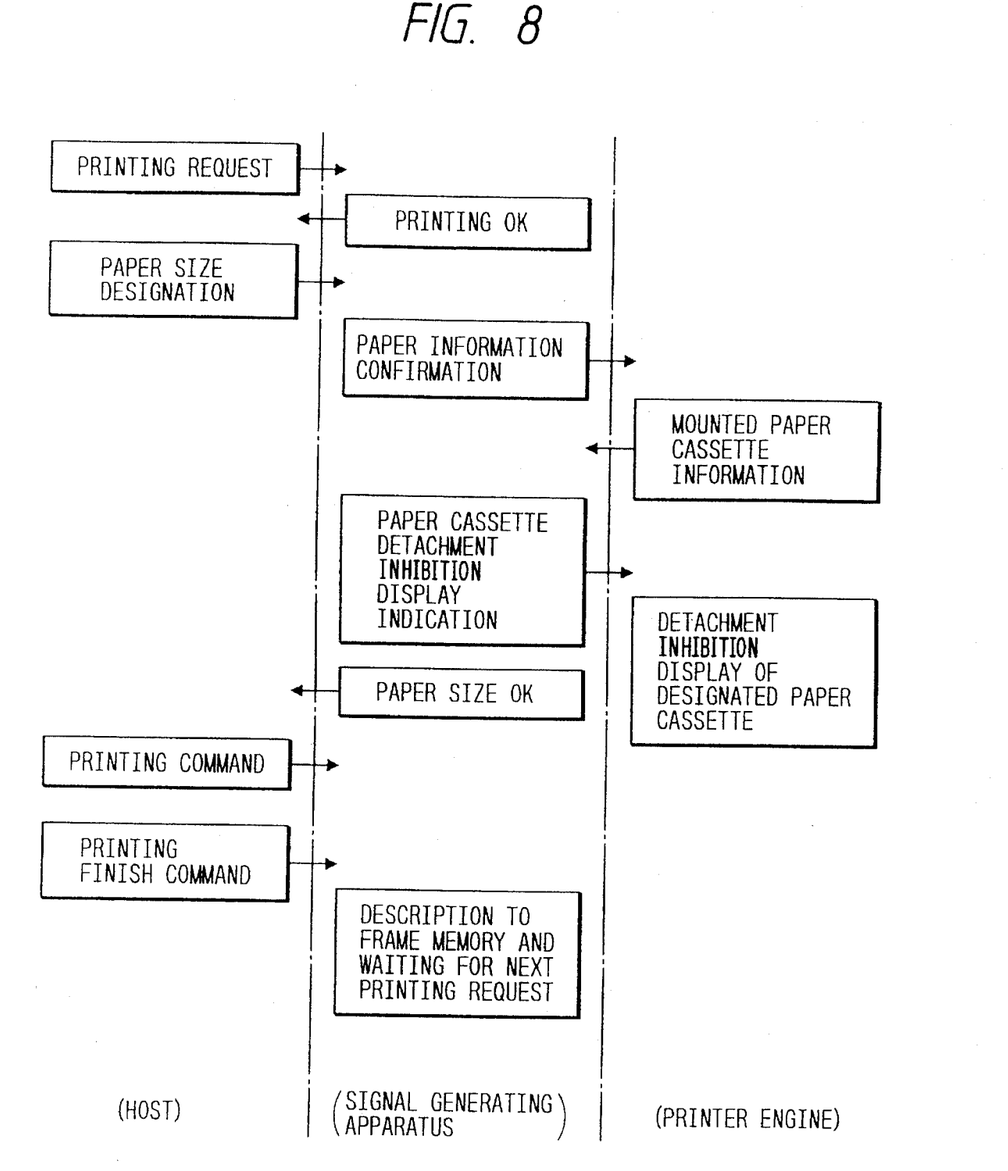
FIG. 8 is a flow chart showing one embodiment of an interface signal of the information printing system having plural information apparatuses and a laser beam printer including plural printing paper cassettes according to the present invention.
Figure 9:
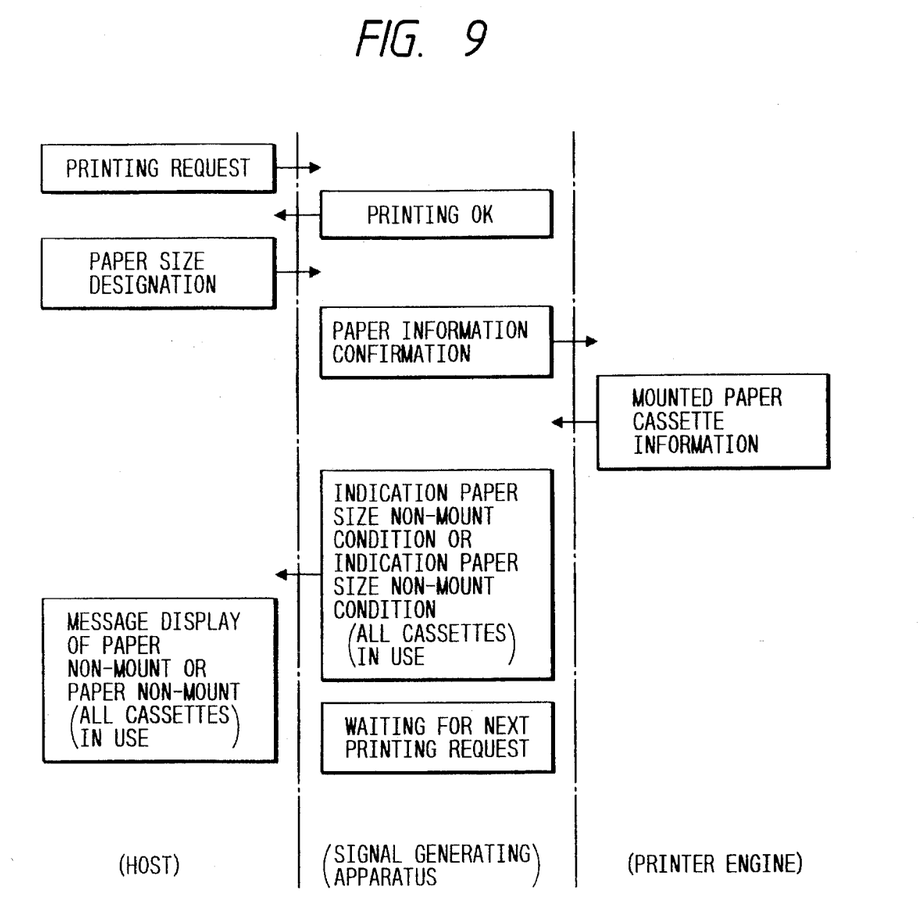
FIG. 9 is a flow chart showing another embodiment of an interface signal of the information printing system having plural information apparatuses and a laser beam printer including plural printing paper cassettes according to the present invention.
Figure 10:
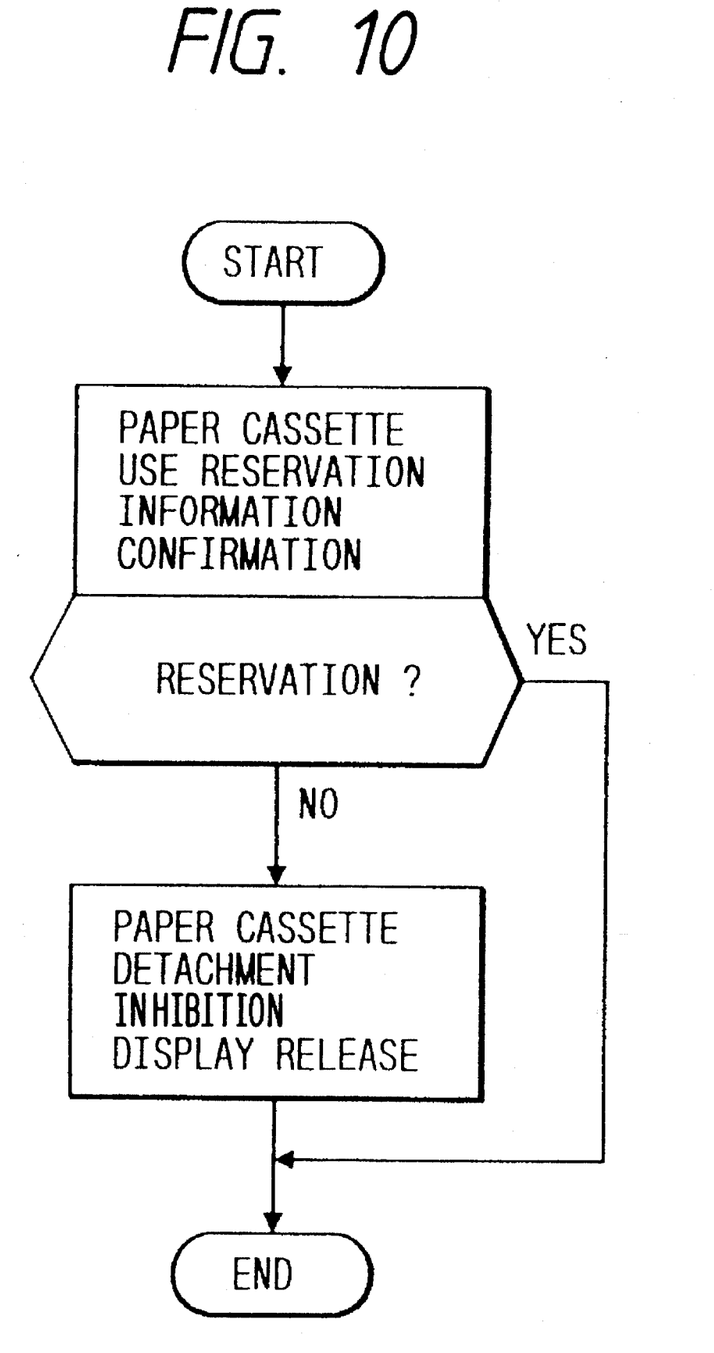
FIG. 10 is a flow chart showing operation of a paper cassette detachment inhibition mechanism unit and a selected printing paper cassette display unit of the information printing system having plural information apparatuses and a laser beam printer including plural printing paper cassettes according to the present invention.

FIGS. 8–10 are flowcharts showing the interface signal between the hosts 201, 202, . . . , 20n and the signal generating apparatus 110.

FIG. 8 is a flowchart in which the printing paper cassette accommodated the printing paper for selection or use in the printing in accordance with the printing information given by the hosts 201, 202, . . . , 20n is mounted on the laser printer engine 120 and the multi-stage cassette printing paper feeding apparatus 160.

FIG. 9 is a flowchart in which the printing paper cassette accommodating the printing paper for selection or use in the printing in accordance with the printing information given by the hosts 201, 202, . . . , 20n is not mounted on the laser printer engine 120 and the multi-stage cassette printing paper feeding apparatus 160.

FIG. 10 is a flowchart showing the release process of the detachment inhibition and the display for the printing paper cassette at the time during the printing for the printing information has been finished.

As shown in FIG. 8, there is a case that the laser beam printer engine 120 is in the condition for being able to carry out the electrophotography process and the signal generating apparatus 110 is the condition for waiting the reception of "printing request" from the hosts 201, 202, . . . , 20n.

When the signal generating apparatus 110 receives the signal of "printing request", the signal generating apparatus 110 sends a reply the status signal of "printing acknowledgement" for indicating the condition for being able to the printing.

When the hosts 201, 202, . . . , 20n receives the status signal of "printing acknowledgement", the hosts 201, 202, . . . , 20n carries out "printing paper size designation". The signal generating apparatus 110 receives the signal of "printing paper information confirmation", the signal generating apparatus 110 sends a reply the command of "printing paper information confirmation" to the laser printer engine 120.

When the laser beam printer engine 120 receives the signal of "printing paper information confirmation", the laser beam printer engine 120 sends a reply of the information of the printing paper cassette mounted on the laser beam printer engine 120 and the multi-stage cassette printing paper feeding apparatus 160 to the signal generating apparatus 110.

The signal generating apparatus 110 compares the printing paper size designation from the hosts 201, 202, . . . , 20n with the printing paper cassette information, and the signal generating apparatus 110 sends the control signals of the detachment inhibition for the printing paper cassette accommodating the designated printing papers and the display indication to the laser beam printer engine 120.

In accordance with the control signals, the laser beam printer engine 120 can carry out the control of the detachment inhibition for the printing paper cassette and the display indication.

Further, the signal generating apparatus 110 sends to the hosts 201, 202, . . . , 20n the status signal of "printing paper size all right (OK)" for indicating the condition on which the printing paper cassette accommodating the designated size printing papers is mounted.

When the hosts 201, 202, . . . , 20n receives the signal of "printing paper size all right", after the hosts 201, 202, . . . , 20n have been received the printing command of one page part, the hosts 201, 202, . . . , 20n sends the command of "printing finish".

When the signal generating apparatus 110 receives the signal of "printing finish", the signal generating apparatus 110 becomes to be the reception waiting condition of the signal of the next "printing request", at the same time the signal generating apparatus 110 starts to the description of the printing dot pattern to the frame memory 115.

When the printing paper cassette accommodating the printing papers of the size designated from the hosts 201, 202, . . . , 20n is not mounted on the laser beam printer engine 120 and the multi-stage cassette printing paper feeding apparatus 160, the signal generating apparatus 110 sends the following signals.

As shown in FIG. 9, the signal generating apparatus 110 sends to the hosts 201, 202, . . . , 20n the status signal of "designated printing paper size non-mounting" or "designated printing paper size non-mounting (plus) all printing paper cassettes in use or selection" and the signal generating apparatus 110 becomes the reception waiting condition for the next "printing requirement".

The signal generating apparatus 110 provides the former stated memory 114 as shown in FIG. 3. The memory 114 stores the reservation information of the printing paper cassette in use or selection at the present printing and also the printing paper cassette accommodating the printing papers for using or selecting the printing for the received printing information.

The signal generating apparatus 110 compares the data of the printing paper cassette reservation information storage memory 114 and the printing paper cassette information mounted on the laser beam printer engine 120 and the multi-stage cassette printing paper feeding apparatus 160, and when all of the printing paper cassettes are used or selected for the printing or reserved for the printing, the signal generating apparatus 110 sends the status of the signal of "designated printing paper size non-mounting (plus) all printing paper cassette in use or selection".

When it is the condition of the "designated printing paper size non-mounting", the operator can mount the printing paper cassette to the vacant printing paper mounting port. However, it is the condition of the "designated printing paper size non-mounting (plus) all printing paper cassettes in use or selection", the operator must extract the printing paper cassette from one printing paper mounting port and mount another printing paper cassette to this printing paper mounting port.

Further, at the time that the printing has been finished the signal generating apparatus 110 indicates to the laser beam printer engine 120 whether or not the operation for the printing paper cassette detachment inhibition mechanism unit 141 and the selected printing paper cassette display unit 142 corresponding to the printing paper cassette used or selected in the printing release.

During the printing finish, as shown in FIG. 10, at the time the printing has been finished, it confirms the data in the printing paper cassette reservation information storage memory 114. When the printing paper cassette having been used is not reserved, it releases the operation for the printing paper cassette detachment inhibition mechanism unit 141 and the selected printing paper cassette display unit 142 corresponding to the printing paper cassette used or selected in the printing.

Besides, when the printing paper cassette having been used has been reserved, it continues the operation for the printing paper cassette detachment inhibition mechanism unit 141 and the selected printing paper cassette display unit 142 corresponding to the printing paper cassette used in the printing and it transfers to the next printing process.

In the above embodiment of the present invention, the information printing system is constituted to divide the signal generating apparatus 110 and the sequence control unit 150 for controlling the laser beam printer engine 120, however it may constitute to make the signal generating apparatus 110 and the sequence control unit 150 as one body, and in the latter constitution the similar effects in the above stated embodiment can be obtained.

We claim:

1. An information printing system comprising:

a plurality of information processing apparatuses for generating image information representing an image to be printed, and printing medium designation information designating a type of printing medium on which the image is to be printed; and a printer, the printer including a plurality of detachable printing medium cassettes for accommodating a plurality of types of printing mediums including the type of printing medium designated by the printing medium designation information, printing medium cassette detachment inhibiting means, responsive to the printing medium designation information, for inhibiting detachment of the printing medium cassette accommodating the type of printing medium designated by the printing medium designation information, printing medium obtaining means, responsive to the printing medium designation information, for obtaining a printing medium of the type designated by the printing medium designation information from the printing medium cassette accommodating the type of printing medium designated by the printing medium designation information, and electrophotographic printing means, responsive to the image information, for electrophotographically printing the image on the printing medium obtained by the printing medium obtaining means.

2. An information printing system comprising:

a plurality of hosts for generating image information representing an image to be printed, and printing paper designation information designating a type of printing paper on which the image is to be printed; and a laser beam printer, the laser beam printer including a plurality of detachable printing paper cassettes for accommodating a plurality of types of printing papers including the type of printing paper designated by the printing paper designation information, printing paper cassette detachment inhibiting means, responsive to the printing paper designation information, for inhibiting detachment of the printing paper cassette accommodating the type of printing paper designated by the printing paper designation information, printing paper obtaining means, responsive to the printing paper designation information, for obtaining a printing paper of the type designated by the printing paper designation information from the printing paper cassette accommodating the type of printing paper designated by the printing paper designation information, and electrophotographic printing means, responsive to the image information, for electrophotographically printing the image on the printing paper obtained by the printing paper obtaining means using a laser beam.

3. An information printing system according to claim 2, wherein the printing paper cassette detachment inhibiting means includes at least one groove provided in each of the printing paper cassettes for engagement by a respective element in response to the printing paper designation information to inhibit detachment of a respective printing paper cassette when the respective printing paper cassette accommodates the type of printing paper designated by the printing paper designation information.

4. An information printing system according to claim 2, wherein the printing paper cassette detachment inhibiting means includes at least one groove provided in each of the printing paper cassettes, a respective rotatable stop lever provided for each groove, and means for rotating each stop lever to engage the respective groove in response to the printing paper designation information to inhibit detachment of a respective printing paper cassette when the respective printing paper cassette accommodates the type of printing paper designated by the printing paper designation information.

5. An information printing system comprising:

a plurality of information processing apparatuses for generating image information representing an image to be printed, and printing medium designation information designating a type of printing medium on which the image is to be printed; and a printer, the printer including a plurality of detachable printing medium cassettes for accommodating a plurality of types of printing mediums including the type of printing medium designated by the printing medium designation information, selected printing medium cassette displaying means, responsive to the printing medium designation information, for displaying an indication that the printing medium cassette accommodating the type of printing medium designated by the printing medium designation information has been selected for use in printing the image, printing medium obtaining means, responsive to the printing medium designation information, for obtaining a printing medium of the type designated by the printing medium designation information from the printing medium cassette accommodating the type of printing medium designated by the printing medium designation information, and electrophotographic printing means, responsive to the image information, for electrophotographically printing the image on the printing medium obtained by the printing medium obtaining means.

6. An information printing system comprising:

a plurality of hosts for generating image information representing an image to be printed, and printing paper designation information designating a type of printing paper on which the image is to be printed; and a laser beam printer, the laser beam printer including a plurality of detachable printing paper cassettes for accommodating a plurality of types of printing papers including the type of printing paper designated by the printing paper designation information, selected printing paper cassette displaying means, responsive to the printing paper designation information, for displaying an indication that the printing paper cassette accommodating the type of printing paper designated by the printing paper designation information has been selected for use in printing the image, printing paper obtaining means, responsive to the printing paper designation information, for obtaining a printing paper of the type designated by the printing paper designation information from the printing paper cassette accommodating the type of printing paper designated by the printing paper designation information, and electrophotographic printing means, responsive to the image information, for electrophotographically printing the image on the printing paper obtained by the printing paper obtaining means using a laser beam.

7. An information printing system according to claim 6, wherein the printer further includes a multi-stage printing paper feeding apparatus having at least two of the printing paper cassettes detachably mounted thereon;

wherein the electrophotographic printing means includes a laser beam printer engine having at least one of the printing paper cassettes detachably mounted thereon; and wherein the selected printing paper cassette displaying means includes respective display elements provided on the laser beam printer engine and the multi-stage printing paper feeding apparatus adjacent the printing paper cassettes detachably mounted thereon.

8. An information printing system according to claim 7, wherein the display elements are LED indicators.

9. An information printing system comprising:

a plurality of information processing apparatuses for generating image information representing an image to be printed, and printing medium designation information designating a type of printing medium on which the image is to be printed; and a printer, the printer including a plurality of detachable printing medium cassettes for accommodating a plurality of types of printing mediums including the type of printing medium designated by the printing medium designation information, selected printing medium cassette displaying means, responsive to the printing medium designation information, for displaying an indication that the printing medium cassette accommodating the type of printing medium designated by the printing medium designation information has been selected for use in printing the image, printing medium cassette detachment inhibiting means, responsive to the printing medium designation information, for inhibiting detachment of the printing medium cassette accommodating the type of printing medium designated by the printing medium designation information, printing medium obtaining means, responsive to the printing medium designation information, for obtaining a printing medium of the type designated by the printing medium designation information from the printing medium cassette accommodating the type of printing medium designated by the printing medium designation information, and electrophotographic printing means, responsive to the image information, for electrophotographically printing the image on the printing medium obtained by the printing medium obtaining means.

10. An information printing system comprising:

a plurality of hosts for generating image information representing an image to be printed, and printing paper designation information designating a type of printing paper on which the image is to be printed; and a laser beam printer, the laser beam printer including a plurality of detachable printing paper cassettes for accommodating a plurality of types of printing papers including the type of printing paper designated by the printing paper designation information, selected printing paper cassette displaying means, responsive to the printing paper designation information, for displaying an indication that the printing paper cassette accommodating the type of printing paper designated by the printing paper designation information has been selected for use in printing the image, printing paper cassette detachment inhibiting means, responsive to the printing paper designation information, for inhibiting detachment of the printing paper cassette accommodating the type of printing paper designated by the printing paper designation information, printing paper obtaining means, responsive to the printing paper designation information, for obtaining a printing paper of the type designated by the printing paper designation information from the printing paper cassette accommodating the type of printing paper designated by the printing paper designation information, and electrophotographic printing means, responsive to the image information, for electrophotographically printing the image on the printing paper obtained by the printing paper obtaining means using a laser beam.

* * * * *